(12) United States Patent
Sullivan et al.

(10) Patent No.: US 9,793,775 B2
(45) Date of Patent: Oct. 17, 2017

(54) METHODS AND APPARATUS FOR REDUCING MACHINE WINDING CIRCULATING CURRENT LOSSES

(71) Applicant: Boulder Wind Power, Inc., Louisville, CO (US)

(72) Inventors: Brian J. Sullivan, Boulder, CO (US); Stephane Eisen, Louisville, CO (US); Jessica L. Colton, Louisville, CO (US)

(73) Assignee: Boulder Wind Power, Inc., Louisville, CO (US)

( * ) Notice: Subject to any disclaimer, the term of this patent is extended or adjusted under 35 U.S.C. 154(b) by 768 days.

(21) Appl. No.: 14/145,468

(22) Filed: Dec. 31, 2013

(65) Prior Publication Data

US 2015/0188375 A1  Jul. 2, 2015

(51) Int. Cl.
*H02K 3/28* (2006.01)
*H02K 3/26* (2006.01)

(52) U.S. Cl.
CPC .............. *H02K 3/28* (2013.01); *H02K 3/26* (2013.01); *Y02E 10/725* (2013.01)

(58) Field of Classification Search
CPC ........... H02K 3/26; H02K 3/28; Y02E 10/725
USPC .................. 310/203, 208; 174/84 R
See application file for complete search history.

(56) References Cited

U.S. PATENT DOCUMENTS

| | | |
|---|---|---|
| 2,797,392 A | 6/1957 | Clogston |
| 4,340,833 A | 7/1982 | Sudo et al. |
| 4,496,793 A | 1/1985 | Hanson et al. |
| 5,172,472 A | 12/1992 | Lindner et al. |
| 5,365,424 A | 11/1994 | Deam et al. |
| 5,428,327 A | 6/1995 | Bahl |
| 5,538,433 A | 7/1996 | Arisaka |
| 5,579,217 A | 11/1996 | Deam et al. |
| 5,619,085 A | 4/1997 | Shramo |
| 5,856,636 A | 1/1999 | Sanso |
| 5,928,757 A | 7/1999 | Shinada et al. |
| 6,141,885 A | 11/2000 | Ishitani et al. |
| 6,229,124 B1 | 5/2001 | Trucco |
| 6,310,387 B1 | 10/2001 | Seefeldt et al. |
| 6,333,857 B1 | 12/2001 | Kanbe et al. |

(Continued)

FOREIGN PATENT DOCUMENTS

| | | |
|---|---|---|
| EP | 1732011 | 12/2006 |
| TW | 200830967 A | 7/2008 |

OTHER PUBLICATIONS

International Search Report and Written Opinion for International Application No. PCT/US/2014/021968, mailed Aug. 15, 2014.

(Continued)

*Primary Examiner* — Bernard Rojas
*Assistant Examiner* — Rashad Johnson
(74) *Attorney, Agent, or Firm* — Cooley LLP

(57) ABSTRACT

In some embodiments, a system includes three conductors, each conductor being on a separate layer such that the layers are parallel to one another and stacked. Each conductor has a winding portion and a terminal portion. The conductors are configured such that at least one electrical interconnect electrically couples two adjacent conductors within the winding portion but the third conductor is electrically isolated from the other two conductors within the winding portion. Within the terminal portion all three conductors are electrically coupled.

8 Claims, 9 Drawing Sheets

(56) References Cited

U.S. PATENT DOCUMENTS

| | | | |
|---|---|---|---|
| 6,388,208 B1 | 5/2002 | Kiani et al. | |
| 6,538,538 B2 | 3/2003 | Hreish et al. | |
| 6,574,108 B1 | 6/2003 | Kramer et al. | |
| 6,593,838 B2 | 7/2003 | Yue | |
| 6,713,685 B1 | 3/2004 | Cotton | |
| 6,820,321 B2 | 11/2004 | Harding | |
| 6,833,603 B1 | 12/2004 | Park et al. | |
| 6,836,036 B2 | 12/2004 | Dube | |
| 6,848,912 B2 | 2/2005 | Zhang | |
| 6,923,552 B2 | 8/2005 | Tseng et al. | |
| 7,061,133 B1 | 6/2006 | Leijon et al. | |
| 7,109,625 B1 | 9/2006 | Jore et al. | |
| 7,112,910 B2 | 9/2006 | Lopatinsky et al. | |
| 7,135,952 B2 | 11/2006 | Harding | |
| 7,204,018 B2 | 4/2007 | Kwong et al. | |
| 7,463,122 B2 | 12/2008 | Kushita et al. | |
| 7,557,423 B2 | 7/2009 | Ching et al. | |
| 7,602,272 B2 | 10/2009 | Whittaker et al. | |
| 7,615,709 B2 | 11/2009 | Goergen | |
| 7,648,900 B2 | 1/2010 | Kirby | |
| 7,710,234 B2 | 5/2010 | Gardner et al. | |
| 7,863,724 B2 | 1/2011 | Douriet et al. | |
| 7,977,237 B2 | 7/2011 | Feustel et al. | |
| 7,979,983 B2 | 7/2011 | Bird et al. | |
| 8,022,532 B2 | 9/2011 | Kasuya et al. | |
| 8,031,033 B2 | 10/2011 | Mansell et al. | |
| 8,063,316 B2 | 11/2011 | Gorcea | |
| 8,089,331 B2 | 1/2012 | Jacobson et al. | |
| 8,110,749 B2 | 2/2012 | Yoshimura et al. | |
| 8,129,625 B2 | 3/2012 | Kato | |
| 8,167,629 B2 | 5/2012 | Ito et al. | |
| 8,319,595 B2* | 11/2012 | Iwaya | H02K 3/26 336/200 |
| 2001/0032388 A1 | 10/2001 | Morris | |
| 2001/0050183 A1 | 12/2001 | Lubert et al. | |
| 2002/0171324 A1* | 11/2002 | Smith | H02K 1/2793 310/268 |
| 2003/0080631 A1 | 5/2003 | Kageyama et al. | |
| 2004/0069527 A1 | 4/2004 | Vanhoutte et al. | |
| 2004/0136169 A1 | 7/2004 | Morimoto et al. | |
| 2004/0150490 A1 | 8/2004 | Smith et al. | |
| 2005/0285470 A1 | 12/2005 | Itoh et al. | |
| 2006/0012263 A1* | 1/2006 | Smith | H02K 1/2793 310/268 |
| 2006/0044083 A1 | 3/2006 | Kuzmenka | |
| 2006/0099801 A1 | 5/2006 | Cranmer et al. | |
| 2006/0109632 A1 | 5/2006 | Berlin et al. | |
| 2006/0202584 A1* | 9/2006 | Jore | H02K 21/24 310/179 |
| 2007/0125574 A1 | 6/2007 | Kim et al. | |
| 2007/0158102 A1 | 7/2007 | Monroe | |
| 2007/0158105 A1 | 7/2007 | Kitao et al. | |
| 2007/0205018 A1 | 9/2007 | Koyama | |
| 2008/0314631 A1 | 12/2008 | Hsu et al. | |
| 2009/0272566 A1 | 11/2009 | Nomiya et al. | |
| 2010/0032195 A1 | 2/2010 | Hayashi | |
| 2010/0085717 A1 | 4/2010 | Sweeney et al. | |
| 2010/0308939 A1 | 12/2010 | Kurs | |
| 2011/0195551 A1 | 8/2011 | Kim | |
| 2011/0241463 A1 | 10/2011 | Iki et al. | |
| 2011/0273048 A1 | 11/2011 | Jore et al. | |
| 2012/0080797 A1 | 4/2012 | Daubenspeck et al. | |
| 2012/0086296 A1 | 4/2012 | Cleveland | |
| 2012/0097436 A1 | 4/2012 | Lai et al. | |
| 2012/0126927 A1 | 5/2012 | Iwaya | |
| 2012/0139682 A1 | 6/2012 | Carlen et al. | |
| 2012/0206132 A1 | 8/2012 | Lepage | |
| 2013/0043970 A1 | 2/2013 | Poddar et al. | |
| 2013/0049500 A1 | 2/2013 | Shan et al. | |
| 2016/0163445 A1* | 6/2016 | Bertels | H01F 3/08 381/397 |
| 2016/0329796 A1* | 11/2016 | Hano | H02K 15/0407 |
| 2016/0336824 A1* | 11/2016 | Duan | H02K 3/26 |

OTHER PUBLICATIONS

"High Speed Layout Design Guidelines," Freescale Semiconductor Application Note, Document No. AN2536, Rev. 2, Apr. 2006, 26 pgs.

Qpedia-2010, "Understanding and Optimizing Thermal Vias," Guenin B, 2010, <URL:http://qats.com/cpanel/UploadedPdf/Qpedia_Thermal_eMagazine_0510_V3_lorez.pdf>.

Kubik et al., "Kubik-2006" PCB racetrack fluxgate sensor with improved temperature stability, Czech Technical University in Prague, Faculty of Electrical Engineering, Technicka 2, CZ-I6627 Praha 6, Czech Republic, 2006 http://www.sciencedirect.com/science/article/ pii/S0924424705007624.pdf.

Gambetta et al., "Designing Printed Circuit Stators for Brushless Permanent Magnet Motors," 2009, URL:http:eprints.usq.edu.au/6491/3/Gambetta_Ahfock_IET_2009_AV.pdf.

* cited by examiner

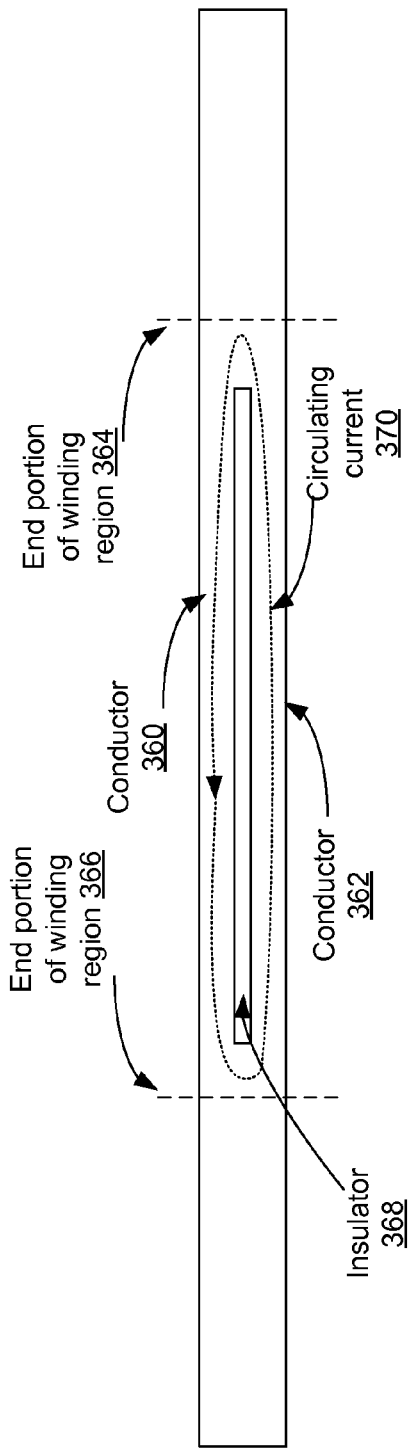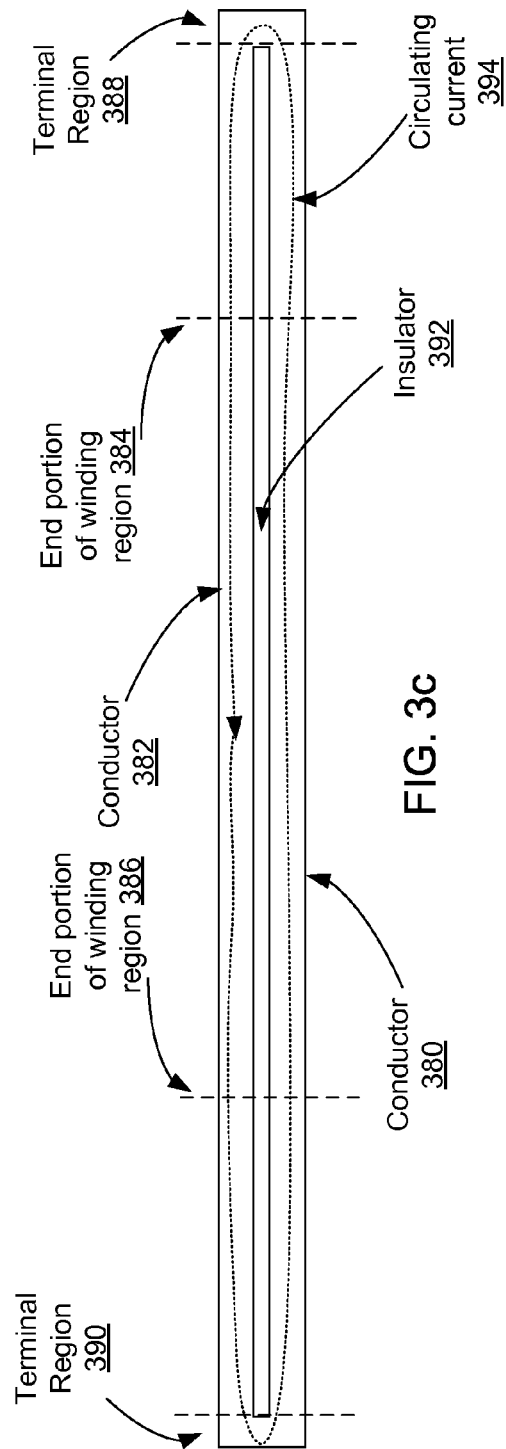

METHODS AND APPARATUS FOR REDUCING MACHINE WINDING CIRCULATING CURRENT LOSSES

BACKGROUND

This invention relates to methods and apparatus for reducing circulating current losses in machine windings.

A primary goal of machine design is to design an electromagnetic circuit that encourages magnetic flux to flow in a manner that maximizes useful performance, while simultaneously minimizing related loss mechanisms. One type of loss with electromagnetic machine design is resistive losses due to circulating currents through closed loops formed by multiple conductive elements. As a greater number of conductors and conductive elements are electrically coupled in parallel, a greater number of closed loops are formed providing additional paths for circulating current losses.

Thus, a need exists for improved systems and methods of reducing circulating current losses in a multi-phase machine.

SUMMARY

In some embodiments, a system includes three conductors, each conductor being on a separate layer such that the layers are substantially geometrically parallel to one another and stacked. Each conductor has a winding portion and a terminal portion. The conductors are configured such that at least one electrical interconnect electrically couples two adjacent conductors within the winding portion but the third conductor is electrically isolated from the other two conductors within the winding portion. Within the terminal portion all three conductors are electrically coupled.

BRIEF DESCRIPTION OF THE DRAWINGS

FIG. 3b illustrates an axial view of a portion of a laminated composite assembly of an electrical machine, according to an embodiment.

FIG. 3c illustrates an axial view of a portion of a laminated composite assembly of an electrical machine, according to another embodiment.

FIG. 4a illustrates a cross-sectional view along line A-A of a winding portion of the laminated composite assembly of FIG. 3a.

DETAILED DESCRIPTION

Figure 1A:
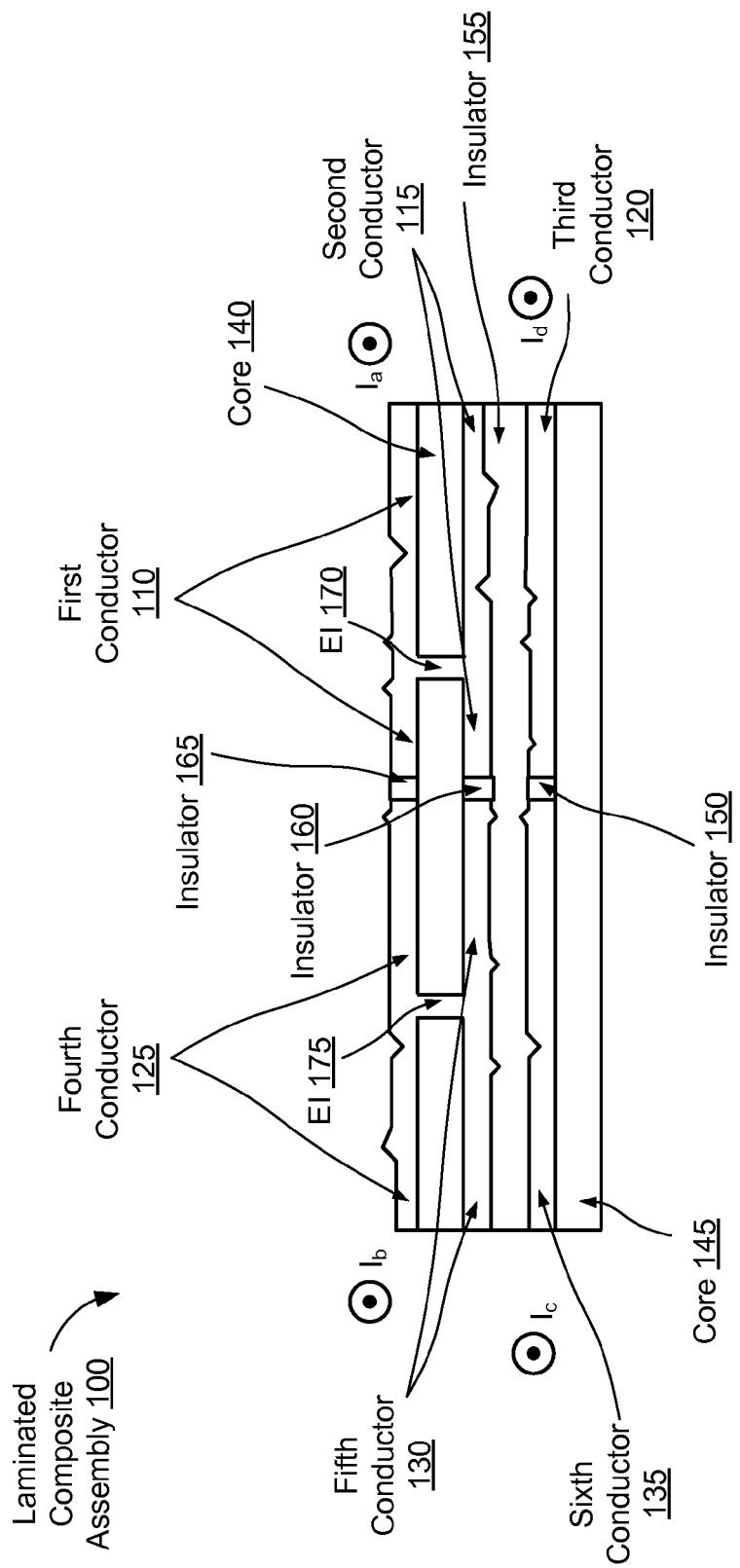
FIG. 1a illustrates a cross-sectional view of a portion of a laminated composite assembly, according to an embodiment.

In some embodiments, a system includes a first conductor having a winding portion within a winding region and a terminal portion within a terminal region. The first conductor defines a first layer. A second conductor defines a second layer substantially geometrically parallel to the first layer and has a winding portion within the winding region and a terminal portion within the terminal region. The first conductor and the second conductor are electrically coupled in the winding region through one or more electrical interconnects. A third conductor defines a third layer substantially geometrically parallel to the first layer and the second layer. The third conductor has a winding portion within the winding region and a terminal portion within the terminal region. The third conductor is electrically isolated from the first conductor and the second conductor within the winding region. Within the terminal region, the first conductor, the second conductor, and the third conductor are electrically coupled through one or more electrical interconnects.

In some embodiments, a system includes a winding portion that includes multiple conductors that are electrically isolated from each other within the winding portion. The conductors are all substantially geometrically parallel to each other. The system further includes a terminal portion. Within the terminal portion the conductors are electrically coupled to each of the other conductors.

In some embodiments, a system includes a first conductor defining a first layer, and a second conductor within the first layer. The first conductor and the second conductor are substantially geometrically parallel to each other and are electrically isolated from each other within a machine winding portion. A third conductor defines a second layer substantially geometrically parallel to the first layer. The third conductor is electrically coupled to the first conductor through at least one electrical interconnect within the machine winding. The third conductor is electrically isolated from the second conductor within the machine winding. The first conductor, the second conductor, and the third conductor are all electrically coupled using at least one electrical interconnect within a terminal portion.

As used herein, the singular forms "a," "an" and "the" include plural referents unless the context clearly dictates otherwise. Thus, for example, the term "a coil" is intended to mean a single coil or a combination of coils.

As used herein, the term "geometrically parallel" generally describes a relationship between two geometric constructions (e.g., two lines, two planes, a line and a plane or the like) in which the two geometric constructions are substantially non-intersecting as they extend substantially to infinity. For example, as used herein, a line is said to be geometrically parallel to another line when the lines do not intersect as they extend to infinity. Similarly, when a planar surface (i.e., a two-dimensional surface) is said to be geometrically parallel to a line, every point along the line is spaced apart from the nearest portion of the surface by a substantially equal distance. Two geometric constructions are described herein as being "geometrically parallel" or "substantially geometrically parallel" to each other when they are nominally parallel to each other, such as for example, when they are parallel to each other within a tolerance. Such tolerances can include, for example, manufacturing tolerances, measurement tolerances, or the like.

As used herein, when implemented in a radial machine, parallel layers may form non-intersecting arcs that have an axis of rotation substantially equal to the center of rotation for the radial machine. Furthermore, in some embodiments, radial conductors that are described as parallel in a radial machine or an axial machine can be geometrically parallel as described above. Alternatively, in other embodiments, radial conductors that are described as parallel in a radial machine or an axial machine can be disposed in a radial direction. Conductors disposed in a radial direction can be non-intersecting within the machine.

As used herein, the term "electrically coupled in parallel" generally describes an electrical connection between two or more conductors in a closed circuit in which the operating current divides into each conductor before recombining to complete the circuit. Similarly stated, the two or more conductors are considered to be combined in an electrically parallel configuration. Conductors that are electrically coupled in parallel can be, but need not be, geometrically parallel. Similarly, geometrically parallel conductors can be, but need not be, electrically coupled in parallel. Furthermore, when two or more conductors are electrically coupled in parallel, the circulating current flows through the conductors such that it flows in a circular pattern, unlike the operating current. Similarly stated, the circulating current in two or more conductors that are electrically coupled in parallel flows in one direction in at least one of the conductors and in the substantially opposite direction through at least one of the other conductors.

As used herein, the term "electrically isolated" generally describes a relationship between two conductors within an area and/or volume. Specifically, if a first conductor is electrically isolated from a second conductor within an area, the first conductor does not intersect or otherwise come in electrical contact with the second conductor within the area. The first conductor may, however, intersect or be in electrical contact with the second conductor outside the area. For example, two conductors can be electrically isolated from each other within a winding region but electrically coupled to each other within a terminal region.

As used herein, the term "layer" generally describes a linear and/or non-linear two dimensional geometric construct and/or surface. For example, a layer can be a plane defined by multiple points on a conductor. As another example, a layer may be a non-planar construct defined by a non-planar portion of a laminated composite assembly. The layer may extend to infinity. Thus, if a first layer is substantially geometrically parallel to a second layer, the areas within and/or defined by the layers do not intersect as the layers extend to infinity. As described herein, a first non-linear layer is said to be geometrically parallel to a second non-linear layer if the first layer and the second layer do not intersect as the layers extend to infinity. Said another way, a first non-linear layer is said to be geometrically parallel to a second non-linear layer if a distance between the first layer and the second layer along a line normal to each layer (or normal to a line tangent to the point of intersection at each layer) is substantially constant. For yet another example, a planar and/or non-planar surface of a laminated composite assembly can also be referred to as a layer.

The embodiments described herein relate generally to conductive windings disposed on or included in a laminated composite assembly. As described in detail herein, a laminated composite assembly can be used to support a portion of an electronic circuit. For example, at least a portion of the laminated composite assembly (also referred to herein as "assembly") can form a portion of an integrated circuit (IC), a printed circuit board (PCB), a PCB assembly, an application-specific integrated circuit (ASIC), or any other suitable electronic circuit support structure. The assemblies described herein can include any suitable number of conducting layers that are separated by an electric insulator configured to substantially prevent current from flowing between the conducting layers except in areas where the insulator is intentionally removed or displaced in order to allow such a current to flow, such as in the case of an electrical interconnect. In other embodiments, the arrangements and methods described herein can be applied to, for example, wire-wound coils of an electromagnetic machine and/or iron-core electromagnetic machines, where the wire-wound coils contain circuits electrically connected in parallel that form a conductive loop that could permit circulating currents and their associated electrical losses.

FIG. 1a illustrates a cross-sectional view of a portion of a laminated composite assembly 100 having electrical conductors (110, 115, 120, 125, 130, 135), electrical interconnects (170, 175), insulators (150, 155, 160, 165), and cores (140, 145). Laminated composite assembly 100 can be used to support, a portion of an electric circuit including electrical conductors, such as electrical conductors 110, 115, 120, 125, 130, and/or 135. For example, the portion of laminated composite assembly 100 can be a portion of an integrated circuit ("IC"), a printed circuit board ("PCB"), a PCB assembly, an application-specific integrated circuit ("ASIC"), or any other suitable electric circuit support structure.

The laminated composite assembly 100 can include multiple layers of conductors (e.g., electrical conductors 110, 115, 120, 125, 130, 135) that are substantially separated by an electric insulator (e.g., a noncore dielectric layer or a core), except in areas where the core is intentionally removed or displaced in order to allow a current flow, such as placement of an electrical interconnect. A core (140 and 145) can form a base that supports and/or separates a first layer of conductors (e.g., disposed on a first surface of the core) from a second layer of conductors (e.g., disposed on a second surface of the core, opposite the first surface). For example, laminated composite assembly 100 can provide a base (e.g., core 140 or 145) for the conductors (e.g., 110, 115, 120, 125, 130, 135) etched on the laminated composite assembly 100. As shown in FIG. 1a, core 140 can provide a base for the first electrical conductor 110, the second electrical conductor 115, the fourth electrical conductor 125, and the fifth electrical conductor 130. Core 145 can provide a base for the third electrical conductor 120 and the sixth electrical conductor 135.

The core 140 and 145 can be, for example, a dielectric material that can selectively isolate (e.g., selectively prevent and/or limit electrical communication between) each of the one or more conducting layers. In some embodiments, the core can be a dielectric material such as, for example, FR-4 or the like. In other embodiments, the core can be formed from any suitable insulating material(s) such as, for example, fiberglass, cotton, or silicon and can be bound by any suitable resin material.

Laminated composite assembly 100 can include one or more layers. As shown in FIG. 1a, each layer can include one or more electrical conductors (110, 115, 120, 125, 130, 135) disposed on a surface of a core (140, 145) that substantially separates that layer from another layer on an opposite surface of the core. Similarly stated, an electrical conductor on a layer can be said to define that layer. For example, the first electrical conductor 110 can be disposed on the top surface of core 140, as shown in FIG. 1a. The second electrical conductor 115 can be disposed on the bottom surface of core 140, as shown in FIG. 1a. The first electrical conductor 110 and the second electrical conductor 115 can be electrically insulated from each other by core 140, except in areas where the conductors 110, 115 are intentionally electrically coupled through the core 140, such as at electrical interconnect 170. Similarly, the fourth electrical conductor 125 and the fifth electrical conductor 130 are each disposed on a different surface of core 140 and thus define different layers of laminated composite assembly 100. The fourth electrical conductor 125 and the fifth electrical conductor 130 can be electrically isolated from each other by core 140, except in areas where the conductors 125, 130 are intentionally electrically coupled through the core 140, such as at electrical interconnect 175.

In some embodiments, the layers disposed on the surface of a core (140, 145) and/or defined by electrical conductors are in the same plane. For example, as shown in FIG. 1*a*, the first conductor 110 and the fourth conductor 125 are disposed on and/or define a layer within a plane. In some embodiments, the layers disposed on the surface of a core (140, 145) and/or defined by electrical conductors are in different planes. For example, as shown in FIG. 1*a*, the first conductor 110 is disposed on and/or defines a layer within a first plane and the second conductor 115 is disposed on and/or defines a layer within a second plane substantially geometrically parallel to the first plane.

Figure 1B:
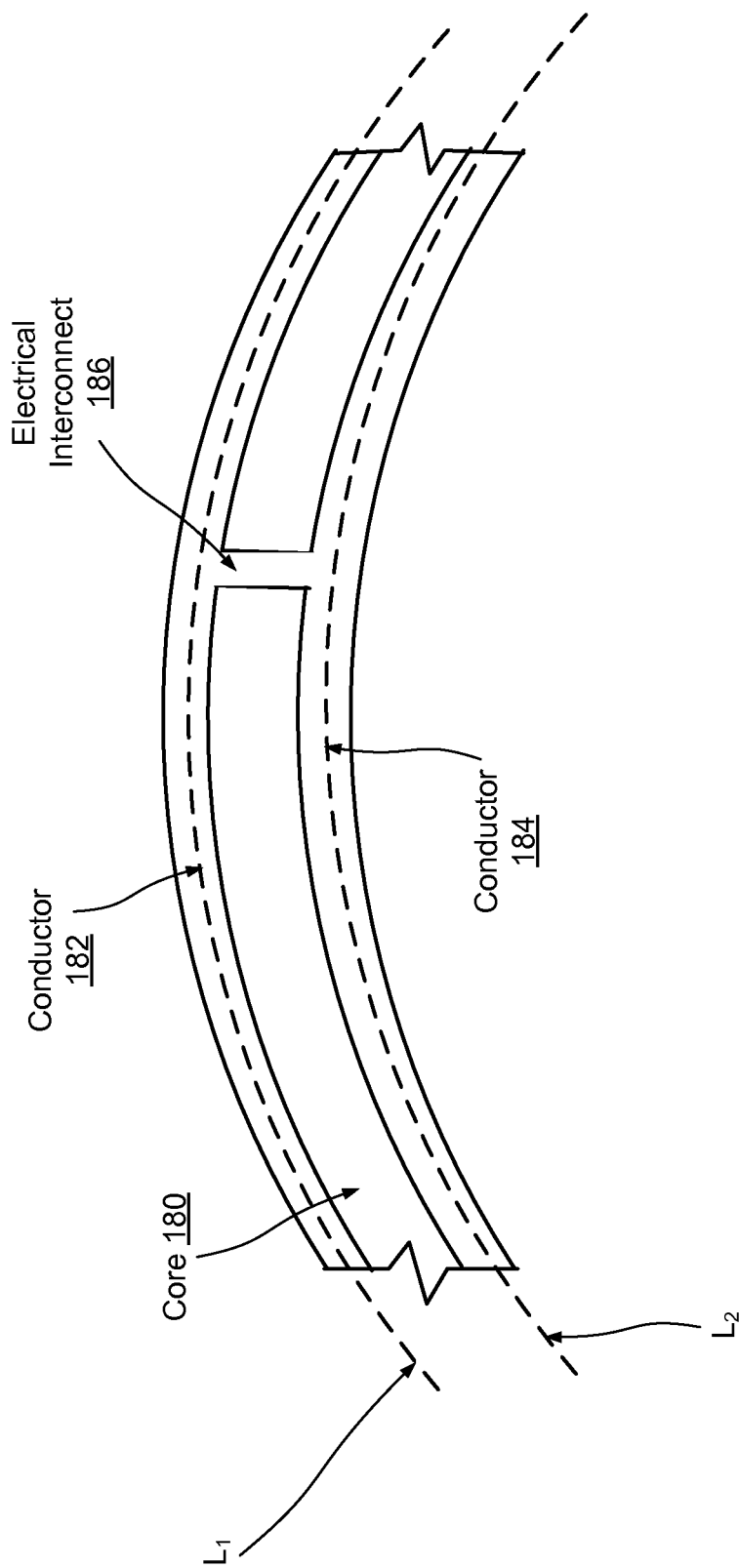
FIG. 1b illustrates a cross-sectional view of a portion of an arced laminated composite assembly, according to an embodiment.

While shown in FIGS. 1*a* and 2-5 as being substantially flat (i.e., a planar surface), the core 140, 145 can be curved or arced as shown in FIG. 1*b*. FIG. 1*b* illustrates a portion of an arced laminated composite assembly having two conductors 182 and 184, a core 180, and an electrical interconnect 186. The conductors 182 and 184 can be functionally and structurally similar to conductors 110, 115, 120, 125, 130, and 135 of FIG. 1*a*. The core can be functionally and structurally similar to core 140, 145 of FIG. 1*a*. The electrical interconnect 186 can be structurally and functionally similar to the electrical interconnects 170 and 175 of FIG. 1*a*. This arced configuration can be useful in certain applications, such as a radial machine. The conductor 182 can define a layer $L_1$ and the conductor 184 can define a layer $L_2$. As shown in FIG. 1*b*, such layers can be parallel and/or non-intersecting even though the layers $L_1$ and $L_2$ are non-planer or arced.

While FIG. 1*b* illustrates an arced laminated composite assembly, a similar arced configuration can apply to other electrical constructs. For example, conductors 182, 184 can be wire-wound windings, which can also define arced layers.

Referring again to FIG. 1*a*, in some embodiments, the electrical conductors (110, 115, 120, 125, 130, 135) are disposed in a substantially flat configuration (e.g., substantially planar). In other embodiments, the electrical conductors (110, 115, 120, 125, 130, 135) are disposed in an arc or curved shape. In such embodiments, for example, while being disposed on and/or defining substantially non-planar layers (e.g., arced or curved), the first electrical conductor 110 can be substantially geometrically parallel to the second conductor 115 and the third conductor 120.

In some embodiments, a noncore dielectric layer (e.g., insulator 155) can be disposed between the conductive layers and can be formed from a material that is substantially similar to, or the same as, the core material. In other embodiments, the noncore dielectric layer can be a different insulating material than the core. In some embodiments, the noncore dielectric layer can be formed from a material (e.g., a pre-prep material) that can be heated to flow into the space between conductors and allowed to cool and/or cure to form a substantially rigid (e.g., hardened) noncore dielectric layer. For example, the fifth electrical conductor 130 can be electrically isolated from the sixth electrical conductor 135 by insulator 155, as shown in FIG. 1*a*. Insulator 155 can also electrically isolate the second electrical conductor 115 from the third electrical conductor 120. In some embodiments, a degree of electrical isolation provided and/or defined by the electric insulating layers can be based on a voltage stress between the conductive layers (e.g., electrical conductors 110, 115, 120, 125, 130, 135) as described in U.S. patent application Ser. No. 13/799,998 filed on Mar. 13, 2013, entitled "Methods and Apparatus for Optimizing Structural Layout of Multi-Circuit Laminated Composite Assembly," (referred to henceforth as the '998 application) the disclosure of which is incorporated by reference herein in its entirety.

Insulators 150, 155, 160, and 165 can also electrically isolate conductors disposed on the same layer of a core. For example, the third electrical conductor 120 (disposed on the top surface of core 145) can be electrically isolated from the sixth electrical conductor 135 (disposed on the top surface of core 145) by insulator 150. Similarly, insulator 160 can electrically isolate the second electrical conductor 115 from the fifth electrical conductor 130, and insulator 165 can electrically isolate the first electrical conductor 110 from the fourth electrical conductor 125. The configuration of insulators (150, 155, 160, 165), cores (140, 145), and conductors (110, 115, 120, 125, 130, 135), as shown in FIG. 1*a*, can be such that each electrical conductor is electrically isolated from every other electrical conductor.

In some embodiments, insulators 150, 160 and 165 of laminated composite assembly 100 can be made from a material substantially similar to insulator 155. Specifically, insulators 150, 155, 160, 165 of laminated composite assembly 100 can be made from a dielectric material or any other suitable material that has poor or substantially no conductivity (i.e., an insulating material). Since they are poor conductors, insulators 150, 155, 160, and 165 can act as a shield between conductive elements (e.g., conductors 110, 115, 120, 125, 130, 135) of laminated composite assembly 100. Similarly stated, insulators 150, 155, 160, and/or 165 can substantially prevent current from flowing between the conductive materials between which insulators 150, 155, 160, and/or 165 are located. Stated yet another way, insulators 150, 155, 160, and/or 165 can form an insulating layer between conductive layers of a laminated composite assembly 100.

In other embodiments, insulators 150 and 160 can be part of and/or formed integral to insulator 155 and/or other noncore dielectric layer insulator. For example, when a material (e.g., a pre-preg material) is heated to form insulator 155, such material can flow to the space between the third conductor 120 and the sixth conductor 135 and/or the space between the second conductor 115 and the fifth conductor 130. When the material hardens, it will form insulator 160 and/or insulator 150, respectively. In still other embodiments, insulators 150, 160 and/or 165 can be omitted from laminated composite assembly 100 and surrounding air can act as an insulator between conductors.

In some embodiments, electrical conductors 110, 115, 120, 125, 130, and 135 can be, for example, conductive traces etched from a conductive sheet laminated to the core 140, 145. More specifically, a conductive sheet on one or more outer surfaces of a core 140, 145 can be masked and the undesired portions of the conductive sheet can be etched away, thereby leaving the desired conductive traces. The electrical conductors 110, 115, 120, 125, 130, and 135 can be any suitable material such as, for example, copper, silver, aluminum, gold, zinc, tin, tungsten, graphite, conductive polymer, and/or any other suitable conductive material.

Electrical conductors 110, 115, 120, 125, 130, and 135 can form part of the circuit of laminated composite assembly 100. In a circuit, electrical conductors 110, 115, 120, 125, 130, and/or 135 can be used to couple components and allow the flow of current through the circuit. In this manner, for example, the conductors 110, 115, 120, 125, 130, and 135 can carry a current in a given direction (e.g., associated with power distribution, a signal carrying information and/or induced by a magnetic source) along a length of the conductors 110, 115, 120, 125, 130, and 135.

In some embodiments, the layers of laminated composite assembly 100 can include internal bus bar conductors, power distribution conductors, end turn conductors of a stator coil, conductors associated with windings of a stator coil, signal conductors, power conductors, and/or any other appropriate conductor. Additionally, a single layer can include multiple types of conductors. For example, a single layer can include an internal bus bar conductor and a power distribution conductor. In some embodiments, the layers can be substantially similar to the layers shown and described with in U.S. Pat. No. 7,109,625, issued Sep. 19, 2006, and entitled "Conductor Optimized Axial Field Rotary Energy Device," which is incorporated herein by reference in its entirety.

In some embodiments, electrical interconnects can be used to electrically couple conductors on separate layers of laminated composite assembly 100. For example, electrical interconnect 170 can electrically couple the first conductor 110 with the second conductor 115 and electrical interconnect 175 can electrically couple the fourth conductor 125 with the fifth conductor 130. Electrical interconnects 170, 175 can each be a solid electrical interconnect, a pressed pin, a plated electrical interconnect that defines a lumen, a buried electrical interconnect, a staked connection, a deformation-based connection, a planar plated surface that provides a location for soldering a terminal 'pin' or other connection, and/or any other connection capable of electrically coupling layers of laminated composite assembly 100. In the case that electrical interconnect 170, 175 defines a lumen, the lumen can remain empty (e.g., a cavity having air), be filled with a non-conductive material, or be filled with a conductive material. In some embodiments, multiple electrical interconnects 170, 175 can be the same (e.g., each are a pressed pin) or different (e.g., one electrical interconnect 170 is a plated electrical interconnect that defines a lumen filled with non-conductive material and another electrical interconnect 175 is a pressed pin).

Electrical interconnects 170, 175 can also be a buried via. A buried via is an electrical interconnect 170, 175 that is fully enclosed within a laminated composite assembly 100 without electrically coupling a surface layer of the laminated composite assembly 100. For example, the first conductor 110 is disposed on a surface layer of the laminated composite assembly 100, as shown in FIG. 1a. A buried via, for instance, would not electrically couple the first electrical conductor 110, but could electrically couple the second conductor 115 and the third conductor 120 (a buried via as described is not shown in FIG. 1a).

In some embodiments, electrical interconnects 170, 175 can be circular in shape. In other embodiments, electrical interconnects 120, 125 can be square, triangle, star, diamond, irregular, and/or any other suitable shape.

Electrical interconnects 170, 175 can electrically couple any number of layers of laminated composite assembly 100. For example, as discussed above, electrical interconnect 170 can electrically couple the first electrical conductor 110 and the second electrical conductor 115 through the non-conductive core 140. Similarly, electrical interconnect 175 can electrically couple the fourth electrical conductor 125 and the fifth electrical conductor 130 through core 140. In other embodiments and while not shown in FIG. 1a, an electrical interconnect can electrically couple any other electrical conductors, such as, for example, the fourth electrical conductor 125, the fifth electrical conductor 130, and the sixth electrical conductor 135.

Figure 2:
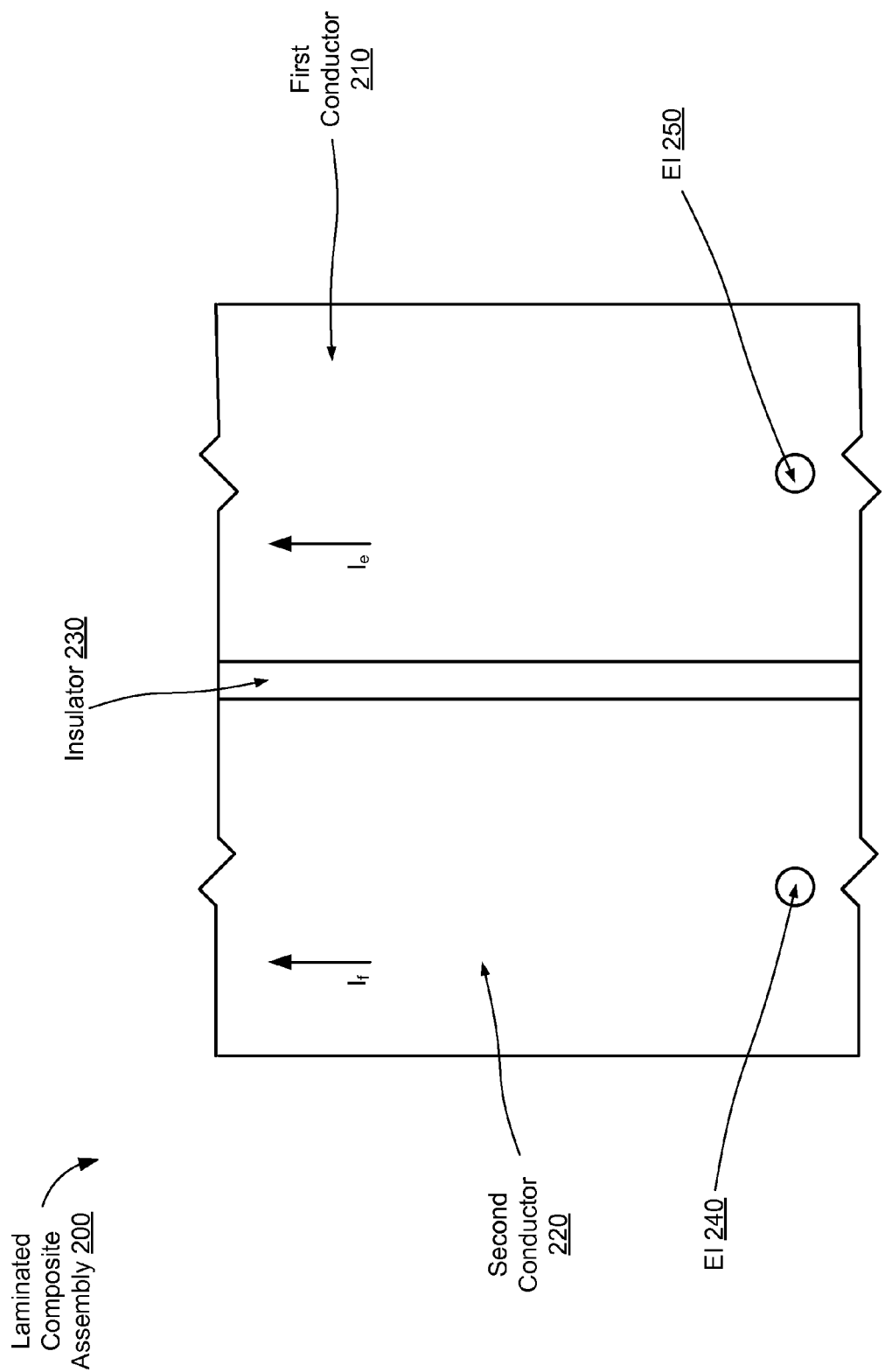
FIG. 2 illustrates a top view of a portion of a laminated composite assembly, according to an embodiment.

FIG. 2 illustrates a top view of a portion of a laminated composite assembly 200 having a first electrical conductor 210, a second electrical conductor 220, an insulator 230, an electrical interconnect 240, and an electrical interconnect 250. Laminated composite assembly 200 (including conductors 210 and 220, insulator 230, and electrical interconnects 240 and 250) is structurally and functionally similar to laminated composite assembly 100.

While only a single layer is shown in FIG. 2, laminated composite assembly 200 can have multiple layers. The first electrical conductor 210 and the second electrical conductor 220 can be disposed on a top surface of a core (not shown in FIG. 2) and can define a layer. Electrical conductors 210 and 220 are structurally and functionally similar to electrical conductors 110, 115, 120, 125, 130, and 135 from FIG. 1a.

Insulator 230 is structurally and functionally similar to insulators 150, 155, 160, and 165 from FIG. 1a. Insulator 230 can electrically isolate the first electrical conductor 210 from the second electrical conductor 220.

Electrical interconnects 240 and 250 are structurally and functionally similar to electrical interconnects 170, 175 from FIG. 1a. Electrical interconnect 240 can electrically couple electrical conductors that are disposed on layers below the second electrical conductor 220 (not shown in FIG. 2) to the second electrical conductor 220. Similarly, electrical interconnect 250 can electrically couple electrical conductors that are disposed on layers below the first electrical conductor 210 (not shown in FIG. 2) to the first electrical conductor 210.

In use, current "$I_e$" and "$I_f$" can flow in the direction shown in FIG. 2. Current "$I_e$" can flow through the first electrical conductor 210. Because the first electrical conductor 210 and the second electrical conductor 220 are electrically isolated from each other by insulator 230, current "$I_e$" does not flow in the second electrical conductor 220. Current "$I_e$" can flow through electrical interconnect 250, allowing current "$I_e$" to flow to conductors below the first electrical conductor 210 that are electrically coupled to the first electrical conductor 210 through electrical interconnect 250. Similarly, current "$I_f$" can flow through the second electrical conductor 220. Current "$I_f$" does not flow through the first electrical conductor 210 because insulator 230 electrically isolates the first electrical conductor 210 from the second electrical conductor 220. Electrical interconnect 240 can allow current to flow from the second electrical conductor 220 to conductors below the second electrical conductor 220.

Current "$I_e$" and current "$I_f$" can be alternating current ("AC") or direct current ("DC"). In an embodiment using AC, current "$I_e$" and current "$I_f$" can be the same electrical phase. In some embodiments, and as described in further detail herein, the laminated composite assembly 200 can be part of a machine stator and the "current $I_e$" and the current "$I_f$" can be induced in first electrical conductor 210 and second electrical conductor 220, respectively, by an alternating magnetic field passing over the first electrical conductor 210 and the second electrical conductor 220. Such a magnetic field can also induce unwanted eddy current in the electrical conductors 210 and 220. Because, however, the first electrical conductor 210 is electrically isolated from the second electrical conductor 220, the eddy currents can be substantially reduced (i.e., compared to if the first electrical conductor 210 and the second electrical conductor were a single larger conductor). With large sections of conductor, eddy currents can circulate, increasing the resistive and heat losses. Altering the size and/or shape of the conductors can further reduce eddy currents. Further discussion of reducing eddy currents can be found in U.S. patent application Ser. No. 13/804,575, filed Mar. 14, 2013, and entitled "Methods and Apparatus for Optimizing Electrically Inoperative Zones on Laminated Composite Assemblies," which is incorporated herein by reference in its entirety.

Referring back to FIG. 1a, in use, current can flow in the direction into the page, as shown. Similar to the current flow of "$I_e$" and "$I_f$" from FIG. 2, current can flow through the electrical conductors 110, 115, 120, 125, 130, and 135. Current "$I_a$" can flow through the first electrical conductor 110. Current "$I_a$" can flow through electrical interconnect 170 to be shared by the second electrical conductor 115. The remaining electrical conductors 120, 125, 130, and 135 are electrically isolated from the first electrical conductor 110 and the second electrical conductor 115, so current "$I_a$" does not flow through the remaining electrical conductors 120, 125, 130, and 135.

Current "$I_b$" can flow through the fourth electrical conductor 125 and through electrical interconnect 175 to be shared by the fifth conductor 130. Because the remaining conductors 110, 115, 120, and 135 are electrically isolated from the fourth electrical conductor 125 and the fifth electrical conductor 130, current "$I_b$" does not flow through the remaining electrical conductors 110, 115, 120, and 135. Current "$I_c$" can flow through the sixth electrical conductor 135 but not the electrical conductors 110, 115, 120, 125, and 130 because the sixth electrical conductor 135 is electrically isolated from the other electrical conductors 110, 115, 120, 125, and 130 in the portion of the laminated composite assembly 100 shown in FIG. 1a. Current "$I_d$" can flow through the third electrical conductor 120 but not the electrical conductors 110, 115, 125, 130, and 135 because the third electrical conductor 120 is electrically isolated from the other electrical conductors 110, 115, 125, 130, and 135.

Currents "$I_a$," "$I_b$," "$I_c$," and "$I_d$" can each be AC or DC. In an AC embodiment, each current "$I_a$," "$I_b$," "$I_c$," and "$I_d$" can be the same phase.

Similar to the discussion above with respect to FIG. 2, because the conductive area as shown in the cross section of FIG. 1a is broken into multiple conductors instead of one large area of conductive material (e.g., copper fill), eddy currents are significantly reduced. The conductive areas are also configured as shown in FIGS. 1 and 2, in part and in some instances, because of limitations on how thick copper can be built in certain processes related to manufacture of laminated composite assemblies. Because eddy currents cannot flow through non-conductive material, the insertion of insulators 150, 155, 160, and 165 can reduce eddy current flow through the laminated composite assembly 100. However, a consequence of the manufacturing limitation can be the formation of paths for closed loop circulating currents.

As discussed in further detail herein, closed loop circulating currents can also be reduced with the described configuration. For example, if the first conductor 110 is electrically coupled to the second conductor 115 by both the electrical interconnect 170 and at a second connection point (such as by a second electrical interconnect not shown in FIG. 1a), circulating currents can form that flow on the first conductor 110, through electrical interconnect 170, on the second conductor 115 and back to the first conductor through the second connection point. This circulating current, however, is less than the circulating current that would occur if the first conductor 110 and the second conductor 115 were also electrically coupled to the third conductor 120.

While not shown in FIG. 1a, the third electrical conductor 120 can be electrically coupled using another electrical interconnect to a layer below the third electrical conductor 120. Such a configuration would define two smaller closed loops (one including the first conductor 110 and the second conductor 115 and another including the third conductor 120 and a conductor (not shown in FIG. 1a) electrically coupled to the third conductor 120 rather than multiple large closed loops including each of the first conductor 110, the second conductor 115, the third conductor 120 and a conductor below the third conductor 120. Two smaller closed loops generate smaller circulating closed loop current losses than a multiple large closed loop.

Figure 3A:
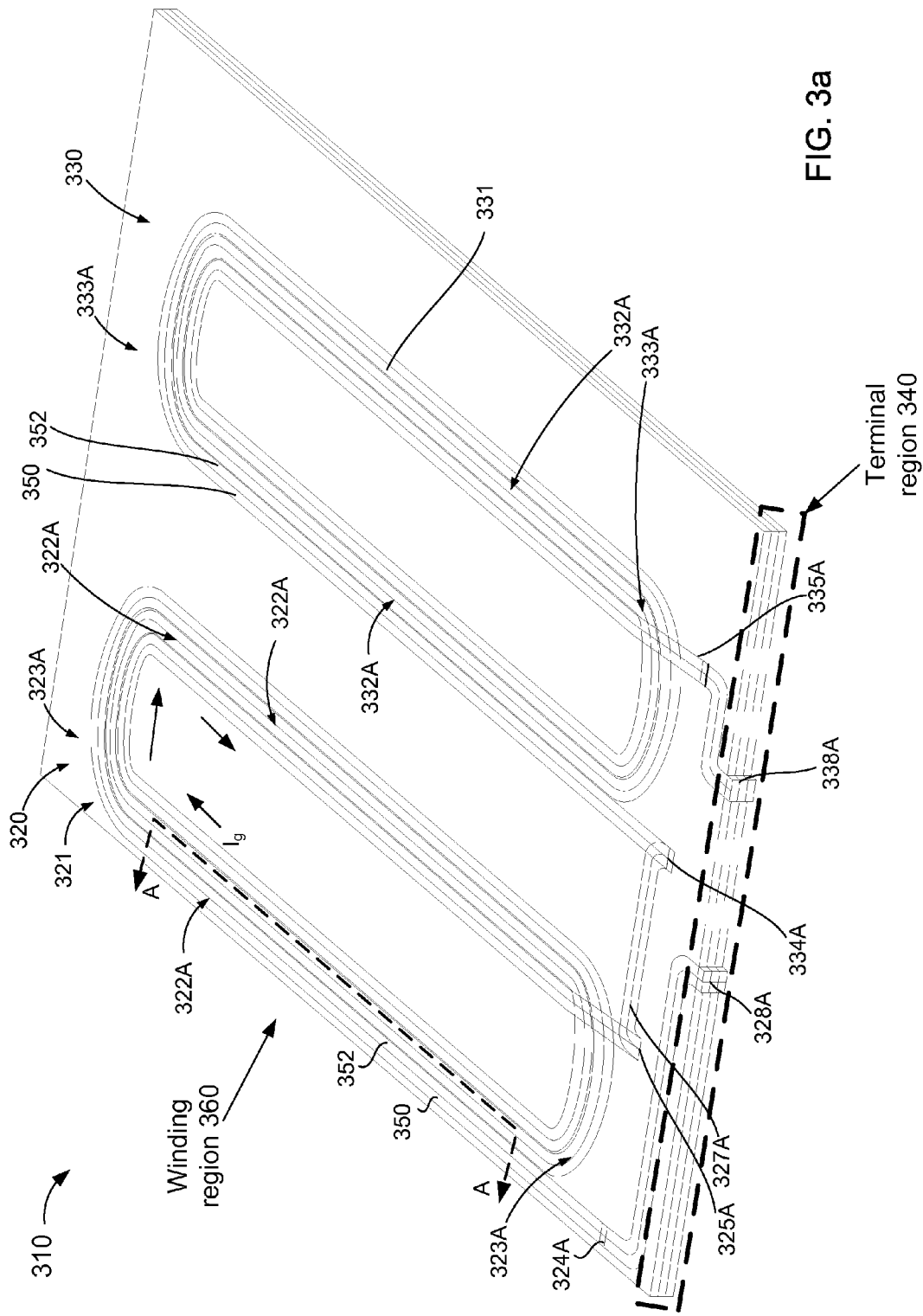
FIG. 3a illustrates a portion of a laminated composite assembly of an electrical machine, according to an embodiment.

FIG. 3a is a schematic illustration of a laminated composite assembly 310 according to an embodiment. The laminated composite assembly 310 (also referred to herein as "assembly") can be included in an electromagnetic machine such as, for example, the machine structure 600 described below with reference to FIG. 6. For example, laminated composite assembly 310 can be included in the stator of an electromagnetic machine. In some embodiments, multiple laminated composite assemblies 310 can be coupled together to form a segmented stator, as described in more detail below with respect to FIG. 6.

The assembly 310 includes a first winding portion 320 and second winding portion 330 within a winding region 360 and a first terminal portion 328A and a second terminal portion 338A within a terminal region 340. As shown, the assembly 310 can be formed from any number of layers. More specifically, the assembly 310 can be formed from any number of conducting layers that are substantially separated by a corresponding number of electrical insulators (e.g., insulating layers such as, noncore dielectric layers, cores, or pre-preg layers). The insulating layers can be any suitable configuration. For example, the insulating layers can be substantially similar to, or the same as, the noncore dielectric layers and/or the cores, described above with reference to FIGS. 1a, 1b, and 2. Thus, the insulating layers can provide a base for the conducting layers of the assembly 310 as well as provide a degree of electrical isolation between adjacent conducting layers.

As shown in FIG. 3a, the first winding portion 320 and the second winding portion 330 can be conductive traces etched from a conducting sheet of the assembly 310 (as described above). Specifically, the first winding portion 320 and the second winding portion 330 are made of a first conductor 350 and a second conductor 352, as discussed in further detail herein. The first winding portion 320 and the second winding portion 330 are each arranged in nonintersecting coils of conductive traces. More specifically, the first winding portion 320 includes coil 321 and the second winding portion 330 includes coil 331. The coil 321 of the first winding portion 320 has a first end portion 324A, a second end portion 325A, an operative portion 322A, and end turns 323A. The first end portion 324A is electrically coupled to a terminal 328A and the second end portion 325A is electrically coupled to an internal connection 327A (e.g., similar to or the same as those described in the '998 application). The operative portion 322A extends between the first end portion 324A, the second end portion 325A, and/or the end turns 323A and facilitates a current flow in a given direction, as described in further detail herein. In a similar manner, the coil 331 of the second winding portion 330 includes a first end portion 334A that is electrically coupled to the internal connection 327A, a second end portion 335A that is electrically coupled to a terminal portion 338A, an operative portion 332A, and end turn 333A.

As described in further detail herein, the coil 321 of the first winding portion 320 and the coil 331 of the second winding portion 330 can be associated with an electrical phase in a single and/or multiphase machine. In a multiphase machine, additional coils (not shown in FIG. 3a) associated with additional phases can be disposed on the laminated composite assembly 310. For example, a three phase machine can include coils associated with a first phase, a second phase and a third phase. Moreover, the terminal portion 328A can be associated with a positive termination of a phase and the terminal portion 338A can be associated with a negative termination of a phase.

In some embodiments, portions of the coil 321 of the winding portion 320 and/or portions of the coil 331 included in the set of coils 331 of the second winding portion 330 can be disposed on multiple layers such as described in U.S. Pat. No. 7,109,625, issued Sep. 19, 2006, entitled "Conductor Optimized Axial Field Rotary Energy Device," the disclosure of which has been incorporated by reference herein in its entirety. For example, the assembly 310 can have one or more layers of the first winding portion 320 that include the operative portion 322A of the coil 321. Similarly, the assembly 310 can have one or more layers of the first winding portion 320 that include the end turns 323A of the first coil 321. The layers associated with the operative portions of the coils 321 can be electrically coupled to one another and/or to the corresponding end turn portions of the coils 321 by one or more electrical interconnects. In this manner, the operative portions of the coils 321 of the first winding portion 320 can facilitate current flow in a given direction. For example, current can flow in a first direction on a first side of the operative portion 322A and can turn along the end turn 323A to flow in a second direction, substantially opposite the first direction, on a second side of the operative portion 322A, as shown by current "$I_g$".

As described above, in some embodiments, one or more of the layers of the laminated composite assembly 310 can include only the end turns, the terminal traces, and/or the internal connections of the coil 321 that would otherwise intersect another portion of the coils 321. For example, as shown in FIG. 3a, the second end portion 325A of the coil 321 runs in a transverse direction across the end turn 323A. Therefore, in some embodiments, the end turns 323A can be disposed on a different layer of the assembly 310 than the second end portion 325A. Thus, the conductive layers of the assembly 310 can be arranged to avoid intersections that would otherwise occur between the conductive traces. In other embodiments, one or more of the layers of the laminated composite assembly 310 can include a subset of the end turns, the terminal traces, the operative portions, and/or other associated conductors for an electrical phase.

The internal connection 327A can be any suitable configuration and can be arranged to place the first winding portion 320 in electrical communication with the second winding portion 330. For example, as shown in FIG. 3a, the internal connection 327A is an internal bus formed from one or more conductive traces that is electrically coupled to the second end portion 325A of the coil 321 included in the first winding portion 320 and is electrically coupled to the first end portion 334A of the first coil 331 included in the second winding portion 330. Thus, a flow of current associated with a phase can flow from the coil 321 of the first winding portion 320 to the coil 331 of the second winding portion 330. Furthermore, with the first end portion 324A of the coil 321 of the first winding portion 320 electrically coupled to the terminal connection 328A and with the second end portion 335A of the coil 331 of the second winding portion 330 electrically coupled to the terminal connection 338A, the terminal connections 328A and 338A, the first coils 321 and 331, and the internal connection 327A form an electrical circuit between the terminal connections 328A and 338A.

As discussed above, the coil 321 of the first winding portion 320 and the coil 331 of the second winding portion 330 are defined by a first conductor 350 and a second conductor 352. The first conductor 350 and the second conductor 352 can be structurally and/or functionally similar to the conductors shown and described above with respect to FIGS. 1 and 2. Accordingly, the first conductor 350 and the second conductor 352 are configured to carry a current. As shown in FIG. 3a, the first conductor 350 is substantially geometrically parallel to and electrically connected in parallel to the second conductor 352. Accordingly, both the first conductor 350 and the second conductor 352 can carry a current associated with a common phase of an electrical machine.

Moreover, as shown in FIG. 3a, the first conductor 350 is electrically isolated from the second conductor 352 within the winding region 360. Similarly stated, the first conductor 350 does not intersect the second conductor 352 within the winding region 360. In some embodiments, an insulator (not shown in FIG. 3a) can be disposed between the first conductor 350 and the second conductor 352 to electrically isolate the first conductor 350 from the second conductor 352 within the winding region 360. By electrically isolating the first conductor 350 from the second conductor 352 within the winding region 360, the number of closed loops within the circuit is reduced. This, in turn, reduces the amount of closed loop circulating current in the circuit as compared to the amount of closed loop circulating current that would be generated in a configuration such as that shown and described with respect to FIG. 3b, which is described in further detail herein.

In some embodiments, the first conductor 350 is electrically coupled to the second conductor 352 at a first terminal portion 328A and a second terminal portion 338A. Accordingly, the first conductor 350 is electrically coupled to the second conductor 352 within the terminal region 340. In such embodiments, while some closed loops remain in the circuit, they are long closed loops and are relatively insensitive to voltage and/or magnetic field variations that might drive circulating currents. Thus, electrically isolating the first conductor 350 from the second conductor 352 within the winding region 360 reduces the amount of closed loop circulating current. Specifically, maintaining electrical isolation of electrical conductors throughout the winding region 360 of the electrical machine, as described with respect to FIGS. 1 and 2, until the conductors are electrically coupled in the terminal region 340 can reduce the formation of circulating currents over a design with electrical conductors that are electrically coupled within the winding region of the machine. Differences in enclosed flux can be reduced due to increased path resistance as well as from the cancelling effects from adjacent poles, which results in a reduction in circulating current losses.

In some embodiments, the first conductor 350 and the second conductor 352 can be electrically coupled at the terminal region 340 as part of the winding. In other embodiments, the electrical coupling of the first conductor 350 and the second conductor 352 can be electrically coupled external to the winding, such as using a solid pin that couples multiple isolated layers and/or conductors. Moreover, as discussed above, having multiple electrically parallel smaller conductors rather than a single large conductor reduces the amount of eddy current formed and/or induced in the conductors.

While shown in FIG. 3a as having two parallel (both geometrically and electrically parallel) conductors (the first conductor 350 and the second conductor 352), in other embodiments any number of parallel conductors can be used. For example, three or more electrically parallel conductors can be used and electrically isolated within the winding region 360. While shown in FIG. 3a as being geometrically parallel, any number of conductors can be used and need not be geometrically parallel.

FIG. 3b illustrates an axial view of a portion of a laminated composite assembly having two conductors 360 and 362 and an insulator 368. The conductors 360, 362 are substantially geometrically parallel and are electrically coupled in parallel within the winding region of the laminated composite assembly, between the end portions of the winding region 364 and the winding region 366. Conductors 360, 362 are structurally and functionally similar to the conductors 110, 115, 120, 125, 130, 135 of FIG. 1a. Insulator 368 is structurally and functionally similar to the insulators 150, 155, 160, 165 of FIG. 1a. Insulator 368 electrically isolates the conductors 360, 362 from each other throughout much of the winding region. This configuration reduces eddy current losses as compared to if insulator 368 were completely removed such that conductors 360 and 362 were one solid conductor. However, the configuration allows for a circulating current path 370.

FIG. 3c illustrates an axial view of a portion of a laminated composite assembly having two conductors 380 and 382 and an insulator 392. Conductors 380 and 382 can be structurally and/or functionally similar to conductors 350, 352 from FIG. 3a and can be functionally and/or structurally similar to the conductors 110, 115, 120, 125, 130, 135 of FIG. 1a. The conductors 380, 382 are substantially geometrically parallel and are electrically coupled in parallel within the terminal regions 388 and 390. Insulator 392 can be structurally and functionally similar to the insulators 150, 155, 160, 165 of FIG. 1a. Insulator 392 can electrically isolate the conductors 380, 382 throughout the winding region. This configuration still allows for paths for circulating current 394, however the longer path length and higher resistance reduces the sensitivity to voltage imbalances that would drive circulating currents.

Figure 4A:
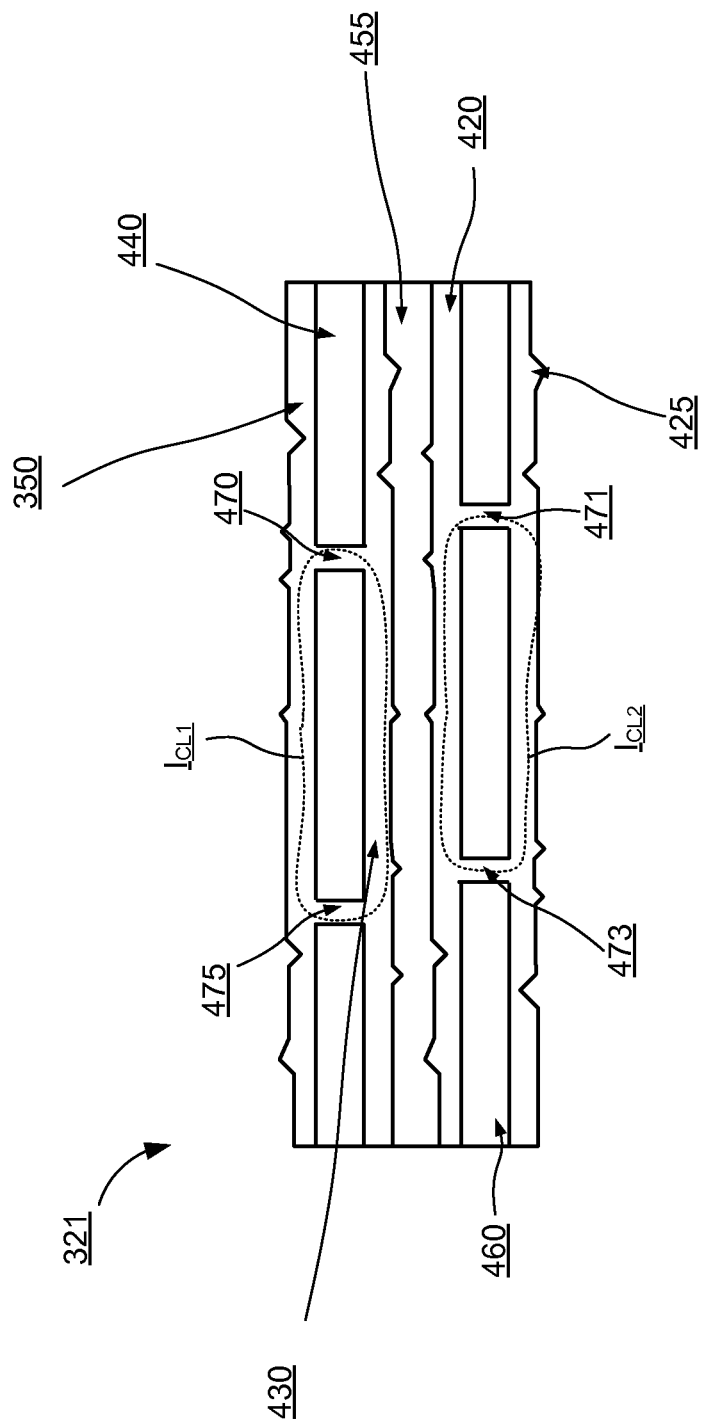

Another way closed loop circulating current can be introduced into a machine is between layers of a laminated composite assembly. For example, as described above with respect to FIG. 3a, portions of the coil 321 of the winding portion 320 and/or portions of the coil 331 of the second winding portion 330 can be disposed on multiple layers. For example, the operative portions of the coils 321 associated with different layers can be electrically coupled to one another and/or to the corresponding end turn portions of the coils 321 by one or more electrical interconnects. FIG. 4a illustrates a cross-section of a coil such as a cross section of coil 321 taken along line A-A in FIG. 3a.

FIG. 4a illustrates an example of multiple layers associated with coil 321. Specifically, FIG. 4a illustrates a portion of conductor 350 shown and described with respect to FIG. 3a. FIG. 4a also illustrates conductor 430, conductor 420 and conductor 425. Conductors 430, 420 and 425 are substantially aligned along a plane substantially perpendicular with a plane defined by conductor 350 (i.e., aligned with conductor 350 as viewed in the direction of the machine's operative magnetic flux), but on different layers of the laminated composite assembly 310. Accordingly, the conductors 430, 420 and 425 are substantially geometrically parallel to conductor 350.

In some embodiments, the portion of the conductors 350, 430, 420 and 425 shown and described with respect to FIG. 4a can be operative portions (e.g., 322A of FIG. 3a) of the conductors 350, 430, 420 and 425. In such embodiments, voltage can be induced in the portion of the conductors 350, 430, 420 and 425 by a rotor that imposes an alternating magnetic field across the conductors 350, 430, 420, 425. In other embodiments, the conductors 350, 430, 420 and 425 can represent any other suitable portion of a machine.

Similar to the discussion with respect to FIG. 1a, an insulating and/or dielectric material (either a core or a pre-preg material) can be disposed between conductors 350, 430, 420 and 425. Specifically, core 440 can be disposed between the conductor 350 and the conductor 430, dielectric material 455 (e.g., pre-preg) can be disposed between conductor 430 and conductor 420 and core 460 can be disposed between conductor 420 and conductor 425.

The portion of coil 321 also includes electrical interconnects 470, 471, 473 and 475. The electrical interconnects 470, 471, 473 and 475 can be structurally and/or functionally similar to the electrical interconnects 170 and 175 shown and described with respect to FIG. 1a. As shown in FIG. 4a, the electrical interconnects 470 and 471 electrically couple conductor 350 and conductor 430 and the electrical interconnects 473 and 475 electrically couple conductor 420 and conductor 425. In some embodiments, the electrical interconnects 470, 471, 473 and 475 are disposed at an end portion of the operative portions of the conductors 350, 430, 420 and 425.

As shown in FIG. 4a, conductor 350 and conductor 430 are not electrically coupled to conductor 420 or conductor 425. In some embodiments, conductor 350 and conductor 430 are not electrically coupled to, electrically isolated from and/or non-intersecting conductor 420 or conductor 425 within a winding region (e.g., winding region 360 of FIG. 3a), but are electrically coupled within a terminal region (e.g., terminal region 340 of FIG. 3a).

Because at least two electrical interconnects 470 and 475 electrically couple conductor 350 with conductor 430, a closed loop current path is defined. Specifically, closed loop current $I_{CL1}$ can flow on conductor 350, through electrical interconnect 470, on conductor 430 and back to conductor 350 through electrical interconnect 475. Similarly, because at least two electrical interconnects 471 and 473 electrically couple conductor 420 with conductor 425, a closed loop current path is defined. Specifically, closed loop current $I_{CL2}$ can flow on conductor 420, through electrical interconnect 471, on conductor 425 and back to conductor 420 through electrical interconnect 473.

Figure 4B:
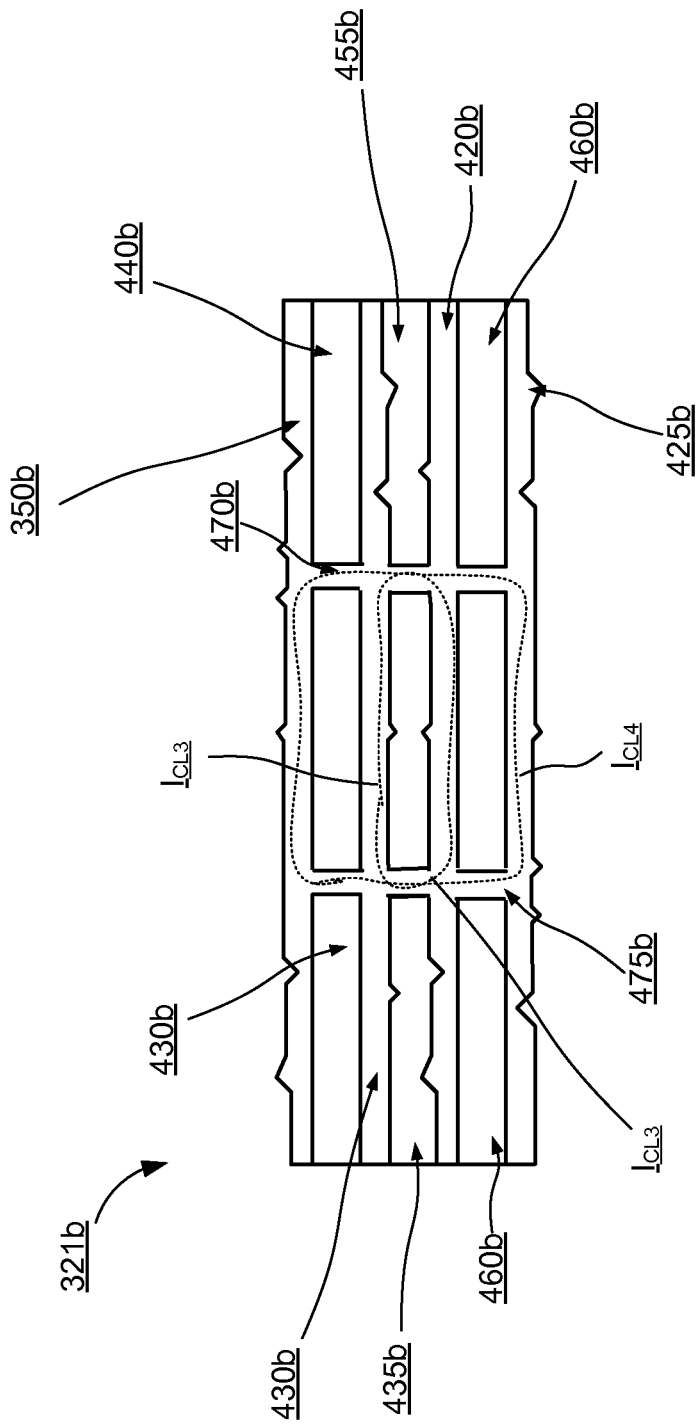
FIG. 4b illustrates a cross-sectional view of a winding portion of a laminated composite assembly.

While two closed loop current paths $I_{CL1}$ and $I_{CL2}$ are defined, the closed loop current paths $I_{CL1}$ and $I_{CL2}$ are smaller than if conductors 350 and 430 were electrically coupled to conductors 420 and 425. Similarly stated, a larger closed loop current path and a greater number of closed loop current paths would be formed if electrical interconnect 475 was extended to include electrical interconnect 473 and electrical interconnect 470 was extended to include electrical interconnect 471, as is shown in FIG. 4b. Thus, by limiting the number of layers of a coil 321 that are electrically coupled within a winding region 360 of a laminated composite assembly 310, the number and size of closed loop current paths can be reduced and, thus, the amount of closed loop circulating current can be reduced.

FIG. 4b is an alternative configuration for the portion of laminated composite assembly 321b (321 in FIG. 4a). Conductors 350b, 430b, 420b, and 425b can be electrically coupled through electrical interconnects 470b and 475b. Laminated composite assembly 321b also includes insulators 440b, 455b, and 460b. Because each of conductors 350b, 430b, 420b and 450b are electrically coupled through electrical interconnects 470b and 475b, laminated composite assembly 321b includes a greater number of circulating current paths than laminated composite assembly 321, shown and described with respect to FIG. 4a. Thus, by not electrically connecting every conductor in a laminated composite assembly, fewer circulating current paths are produced and overall circulating current losses are reduced.

Figure 5:
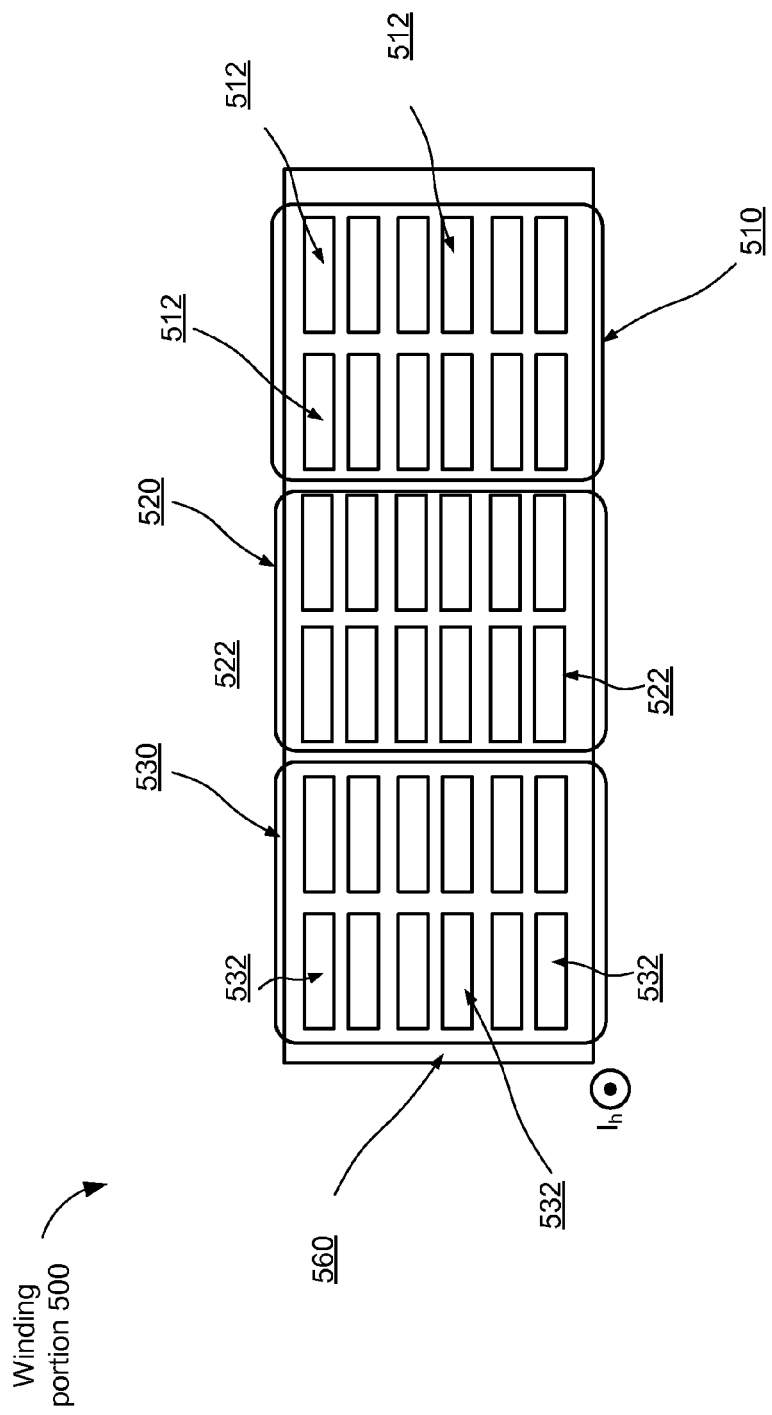
FIG. 5 illustrates a cross-sectional view of a winding portion of an electrical machine, according to an embodiment.

FIG. 5 is an illustration of a cross-section of a winding portion 500 of an electrical machine having three electrical sections 510, 520 and 530 and insulator 560. Electrical section 510 includes multiple electrical conductors 512, electrical section 520 includes multiple electrical conductors 522, and electrical section 530 includes multiple electrical conductors 532. The multiple electrical conductors 512, 522, and 532 are structurally and functionally similar to the electrical conductors 110, 115, 120, 125, 130, and 135 of FIG. 1a. The insulator 560 is structurally and functionally similar to the insulators 150, 155, 160, and 165 of FIG. 1a.

The electrical conductors 512, 522, and 532 are separated by insulator 560. While not shown, the electrical conductors 512 can be electrically coupled within the winding portion 500 (e.g., using an electrical interconnect) such that each electrical conductor 512 can be electrically coupled in parallel with the other electrical conductors 512. Similarly, the electrical conductors 522 can be electrically coupled within the winding portion 500 such that each electrical conductor 522 can be electrically coupled in parallel with the other electrical conductors 522; and the electrical conductors 532 can be electrically coupled within the winding portion 500 such that each electrical conductor 532 can be electrically coupled in parallel with the other electrical conductors 532.

The electrical conductors 512 can be electrically isolated by insulator 560 from the electrical conductors 522 and 532 within the winding portion 500. Similarly, the electrical conductors 522 can be electrically isolated by insulator 560 from the electrical conductors 512 and 532 within the winding portion 500; and the electrical conductors 532 can be electrically isolated by insulator 560 from the electrical conductors 512 and 522 within the winding portion 500.

As shown in FIG. 5, the electrical section 510 defines a group of conductors 512 that are electrically coupled in parallel within the winding portion 500. Electrical section 510 can also be known as an in-hand portion. As shown in FIG. 5, electrical section 510 can be two conductors wide (i.e., in the direction perpendicular to the operative magnetic flux) by six conductors thick (i.e., in the direction parallel to the operative magnetic flux). Though shown as two conductors wide and six conductors thick, electrical section 510 can have any number of electrical conductors in the width and/or thickness directions.

In use, a current can flow through the electrical conductors 512, 522 and 532. As shown in FIG. 5, current "$I_n$" can flow in the direction of into or out of the page. As discussed above, because electrical section 510 includes multiple conductors 512 rather than a single large conductor, the eddy currents induced in the electrical section 510 are significantly reduced. Similarly, because electrical section 520 includes multiple conductors 522 rather than a single large conductor, the eddy currents induced in the electrical section 520 are significantly reduced; and because electrical section 530 includes multiple conductors 532 rather than a single large conductor, the eddy currents induced in the electrical section 530 are significantly reduced.

In some embodiments, a machine with multiple phases (i.e., a multi-phase machine) can have multiple machine winding portions 500, one for each phase of the multi-phase machine. Thus, the winding portion 500 can be associated with a single phase. In such embodiments, the electrical sections 510, 520 and 530 can each be associated with the same phase of a multi-phase machine. Additionally, in some embodiments, the conductors 512 are electrically coupled to the conductors 522 and 532 at a terminal portion (not shown in FIG. 5). By electrically isolating within the winding portion 500 the electrical section 510 from the electrical section 520 and the electrical section 530, the number of closed loop current paths can be reduced.

Additionally, in some embodiments, each conductor 512 can be electrically coupled to every other conductor 512 within the terminal portion, such that the conductors 512 are electrically coupled in parallel. In some embodiments, conductors 512 can be electrically coupled in parallel to the other conductors 512 within the winding portion. In some embodiments, not every conductor 512 is electrically coupled within the winding portion to the other conductors 512. In such embodiments, the number and/or size of the closed loop current paths can be further reduced.

Figure 6:
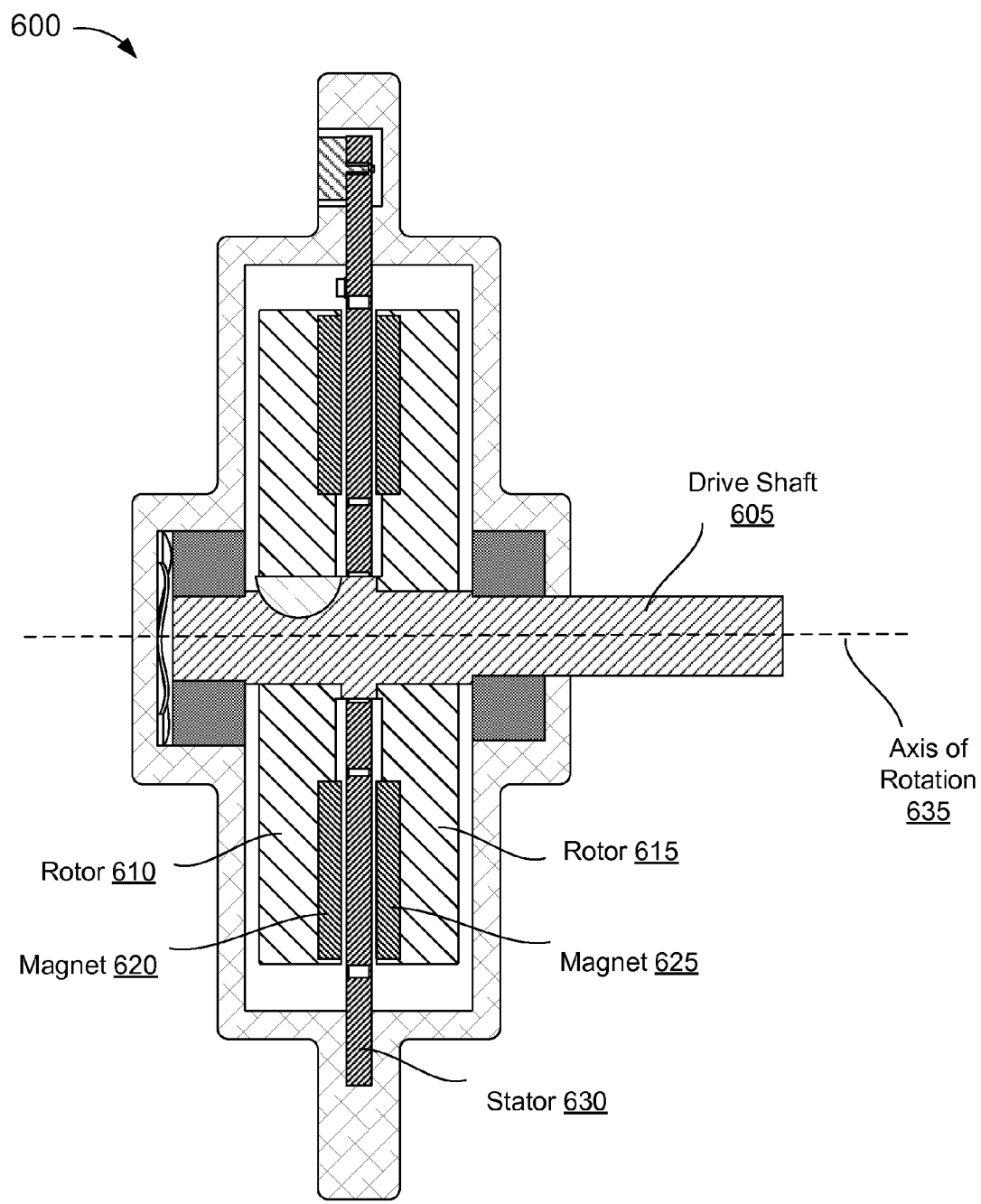
FIG. 6 is a cross-sectional illustration of an axial flux machine structure, according to an embodiment.

In some embodiments, voltage can be induced in the conductors of a laminated composite assembly. For example, FIG. 6 is a schematic illustration of a cross-sectional view of an axial flux machine having a drive shaft 605, rotor segments 610 and 615, a stator 630, and magnets 620 and 625. The machine in FIG. 6 can be, for example, a wind turbine generator. In some embodiments, the laminated composite assemblies and/or winding portions of FIGS. 1-5 can be a portion of a laminated composite assembly defining a machine winding in a stator (e.g., stator 630). Further details regarding generators and machine windings are provided in U.S. Pat. No. 7,109,625, issued Sep. 19, 2006, and entitled "Conductor Optimized Axial Field Rotary Energy Device," which has been incorporated herein by reference in its entirety.

In some embodiments, drive shaft 605 can be fixedly coupled to rotor segments 610, 615 (formed of a magnetically permeable material such as steel), and magnets 620, 625 can be fixedly coupled to rotor segments 610, 615. The end of drive shaft 605 that is not fixedly coupled to rotors 610, 615 can protrude through an opening of the generator housing. In some embodiments, the protruding end of drive shaft 605 can be coupled to an exterior device, such as blades of a wind turbine. When wind causes the blades of the wind turbine to move, drive shaft 605 rotates, causing rotor segments 610, 615 to rotate, in turn causing magnets 620, 625 to rotate.

Magnets 620, 625 can be rings that have poles N and S that alternate around the ring. In some embodiments, magnets 620, 625 can be made of individual segments: Magnets 620, 625 can be magnetic material including rare earth metals such as alloys of neodymium, iron, and/or boron. Magnets 620, 625 can have any even number of poles.

Stator 630 can be a laminated composite assembly, including a PCB, with conductive layers that are electrically coupled with electrical interconnects as described with respect to the previous figures. The stator 630 can be a segmented stator, for example, and can include any number of stator portions that can be substantially similar to stator portions described in U.S. Patent Application Publication No. 2011/0273048, the disclosure of which is incorporated herein by reference in its entirety. Each stator portion can include at least one laminated composite assembly (e.g., at least one PCB), such as, for example, those described herein with respect to FIGS. 1-5. For example, the laminated composite assembly 310 described with respect to FIG. 3a, can form a stator portion of a segmented stator. Multiple laminated composite assemblies 310 can be coupled together to form a segmented stator.

In use, magnets 620 and 625 can be positioned so that an N pole on magnet 620 faces an S pole on magnet 625. The alternating magnetic poles of magnets 620, 625 generate a circumferentially alternating magnetic flux in the air gap formed between the rotor segments 610, 615, where the stator is located. A force (e.g., wind) can cause rotation of drive shaft 605 around the axis of rotation, which causes rotor segments 610, 615 to rotate with drive shaft 605, in turn causing magnets 620, 625 to rotate around drive shaft 605 (i.e., around the axis of rotation 635). The rotation of magnets 620, 625 causes the alternating magnetic flux to move with respect to the stator 630, which can induce an alternating voltage in the windings contained in stator 630 (e.g., the conductors of the laminated composite assembly).

In some embodiments, a current can be applied to stator 63Q which can produce Lorentz forces between the flowing current and the magnetic field generated by magnets 620, 625. The resulting torque can cause rotor segments 610, 615 to rotate, in turn causing drive shaft 605 to rotate. Thus, in some embodiments, the device in FIG. 6 can function as a motor rather than a generator.

In some embodiments, the laminated composite assemblies and/or the winding portions of FIGS. 1-5 can be a portion of a laminated composite assembly defining a machine winding in a stator (e.g., stator 630). The laminated composite assemblies 100 and/or 200 can include radial portions on each layer and end turn portions on a subset of the layers. As discussed above, the current in the layers of laminated composite assembly 100, 200 can be induced due to the magnets 620, 625 rotating around drive shaft 605.

The embodiments disclosed herein (e.g., the laminated composite assemblies and/or the winding portions) can be used in at least one of an axial flux machine, a radial flux machine, a linear machine and/or any other suitable machine.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made.

For example, while shown and described above with respect to laminated composite assemblies, the stator portions and/or windings can apply to other electrical constructs. For example, the conductors described herein can be wire-wound windings, which can also define and/or be aligned in one or more layers.

Although various embodiments have been described as having particular features and/or combinations of components, other embodiments are possible having a combination of any features and/or components from any of embodiments as discussed above.

What is claimed is:

1. An apparatus, comprising:
    a first conductor within a laminated composite assembly, the first conductor (1) having a winding portion within a winding region of the laminated composite assembly and a terminal portion within a terminal region of the laminated composite assembly and (2) defining a first layer;
    a second conductor within the laminated composite assembly, the second conductor (1) having a winding portion within the winding region and a terminal portion within the terminal region and (2) defining a second layer substantially geometrically parallel to the first layer, the winding region including at least one electrical interconnect electrically coupling the winding portion of the first conductor with the winding portion of the second conductor; and
    a third conductor within the laminated composite assembly, the third conductor (1) having a winding portion within the winding region and a terminal portion within the terminal region and (2) defining a third layer substantially geometrically parallel to the first layer and the second layer, the winding region not including an electrical interconnect between the winding portion of the third conductor and the winding portion of the first conductor, the winding region not including an electrical interconnect between the winding portion of the third conductor and the winding portion of the second conductor, the terminal region including at least one electrical interconnect electrically coupling the terminal portion of the first conductor with the terminal portion of the second conductor and the terminal portion of the third conductor.

2. The apparatus of claim 1, further comprising:
    an insulation layer defining a layer substantially geometrically parallel to the first layer and the second layer, the insulation layer positioned between the first conductor and the second conductor.

3. The apparatus of claim 1, wherein the first conductor is associated with a phase of a multi-phase machine, the second conductor is associated with the phase of the multi-phase machine, and the third conductor is associated with the phase of the multi-phase machine.

4. The apparatus of claim 1, wherein the first conductor, the second conductor, and the third conductor are included in at least one of an axial flux machine, a radial flux machine, or a linear machine.

5. The apparatus of claim 1, wherein the winding portion of the first conductor is configured such that a voltage is induced in the winding portion of the first conductor in response to a magnetic field from a rotor moving with respect to the winding portion of the first conductor.

6. The apparatus of claim 1, wherein the laminated composite assembly is a printed circuit board.

7. The apparatus of claim 1, wherein the at least one electrical interconnect electrically coupling the winding portion of the first conductor with the winding portion of the second conductor is at least one of a plated via, a buried via, a staked connection, or a deformation-based connection.

8. The apparatus of claim 1, wherein the terminal portion of the first conductor is a first terminal portion of the first conductor, the terminal portion of the second conductor is a first terminal portion of the second conductor, and the terminal portion of the third conductor is a first terminal portion of the third conductor,
    the first conductor has a first end portion directly coupled to the first terminal portion of the first conductor and a second end portion directly coupled to a second terminal portion of the first conductor, the second conductor has a first end portion directly coupled to the first terminal portion of the second conductor and a second end portion directly coupled to a second terminal portion of the second conductor, the third conductor has a first end portion directly coupled to the first terminal portion of the third conductor and a second end portion directly coupled to a second terminal portion of the third conductor, the second terminal portion of the first conductor being electrically coupled to the second terminal portion of the second conductor and the second terminal portion of the third conductor.

\* \* \* \* \*

UNITED STATES PATENT AND TRADEMARK OFFICE
CERTIFICATE OF CORRECTION

| | |
|---|---|
| PATENT NO. | : 9,793,775 B2 |
| APPLICATION NO. | : 14/145468 |
| DATED | : October 17, 2017 |
| INVENTOR(S) | : Brian J. Sullivan et al. |

Page 1 of 1

It is certified that error appears in the above-identified patent and that said Letters Patent is hereby corrected as shown below:

In the Specification

Column 5, Line 58:
"a pre-prep material) that can be heated to flow into the space" should be -- a pre-preg material) that can be heated to flow into the space --

Column 17, Line 25:
"63Q which can produce Lorentz forces between the flowing" should be -- 630 which can produce Lorentz forces between the flowing --

Signed and Sealed this
Twelfth Day of December, 2017

Joseph Matal
*Performing the Functions and Duties of the
Under Secretary of Commerce for Intellectual Property and
Director of the United States Patent and Trademark Office*